Nov. 28, 1939.   H. A. WINKELMANN   2,181,632
INSULATED ELECTRICAL CONDUCTOR
Filed April 29, 1937

Inventor
Herbert A. Winkelmann,
By Zabel Carlson, Gritzbaugh & Wells

Patented Nov. 28, 1939

2,181,632

UNITED STATES PATENT OFFICE 2,181,632

INSULATED ELECTRICAL CONDUCTOR

Herbert A. Winkelmann, Chicago, Ill., assignor to Marbon Corporation, Chicago, Ill., a corporation of Delaware Application April 29, 1937, Serial No. 139,737

7 Claims. (Cl. 174—121)

This invention relates to insulated conductors, and more particularly to flexible insulated wire in which the insulation comprises a rubber hydrochloride composition.

Many types of dielectric materials have been applied to conductors, by various methods. In some cases the insulation material is tubed on to the bare wire; in other cases it is tubed over a core of other insulation material. In many instances the insulation material is dissolved in a volatile solvent and applied to the wire by spraying, brushing, or dipping.

Insulation compositions of different types may be applied to the same wire; as for example, rubber may be tubed over bare wire, a fabric applied over the rubber, and another material such as cellulose acetate, vinyl resin, or the like may impregnate and coat the fabric. This type of insulated conductor is particularly used for ignition cable and for other conductors carrying high voltages. For such cables, and to a certain extent for all insulated conductors, it is very important that the insulation material not only have high dielectric strength, good flexibility, water resistance, and oil resistance, but it should be able to withstand ozone and ultra violet light due to corona effect.

Rubber hydrochlorides have high dielectric strength, are tough and flexible even without plasticization, and have high water and oil resistance. Their resistance to ozone and ultra violet light is also far superior to many other insulating materials.

I have found, however, that stabilized rubber hydrochlorides are far superior to unstabilized rubber hydrochlorides as insulators for wires, and give particularly valuable results when used as a protective coating on ignition wires. To a large extent this superiority is due to the increased resistance of stabilized rubber hydrochloride to ozone and to ultra violet light.

Although all stabilized rubber hydrochlorides are more effective than unstabilized rubber hydrochlorides, I have obtained the best results with rubber hydrochlorides stabilized with magnesium oxide, magnesium carbonate, barium oxides, calcium oxide, and litharge.

These stabilized rubber hydrochlorides may be applied by methods used for applying other insulating materials. They may be tubed on to the wire or may be dissolved in volatile solvents and coated on the wire. For ignition cables the stabilized rubber hydrochloride is coated over the outer fabric covering.

Figure 1:
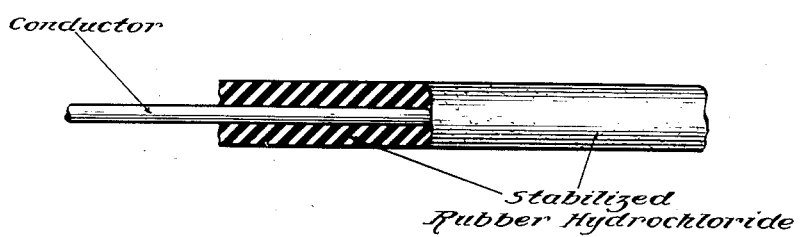
Fig. 1 illustrates an insulated electrical conductor of the invention in which the stabilized rubber hydrochloride of the invention is in direct contact with the metallic conductor.
Figure 2:
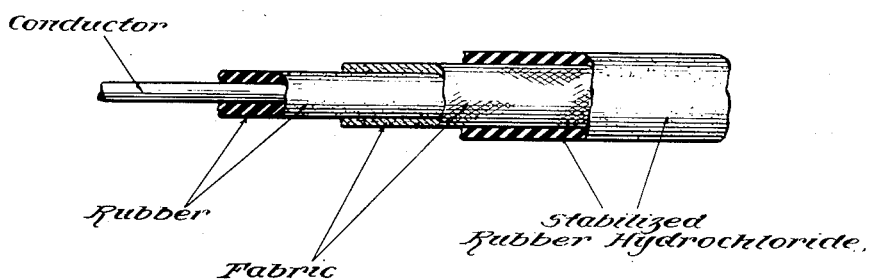
Fig. 2 illustrates an insulated electrical conductor of the invention in which the stabilized rubber hydrochloride is coated on fabric covering rubber insulation.

For purposes of illustration, the following formulae which have been found suitable for wire insulation are given:

| | | | |
|---|---|---|---|
| Rubber hydrochloride | 100 | 100 | 100 |
| Magnesium oxide | 10 | 10 | — |
| Litharge | 10 | — | 10 |

Various resins such as chlorinated diphenyls, phenol-aldehydes, ester gum, rosin, polycumarones, alkyds modified with resin acids or ester gum, may be incorporated with the rubber hydrochloride to increase the adhesion of the composition. These are particularly valuable when the composition is applied directly to the bare wire.

Plasticizers such as dibutyl phthalate, tricresyl phosphate, methyl abietate, soft chlorinated diphenyls, soft polycumarones, may be added to increase the flexibility of the compositions.

Likewise, waxes such as paraffin wax, Opal wax, carnauba wax, beeswax, may be used in small proportions to increase water resistance.

These additional materials are not essential and ordinarily should be used in minor amounts. Naturally the type and amount of these materials must be chosen in accordance with their dielectric properties, water, oil, and ozone resistance.

Various types of rubber hydrochlorides may be used. The amorphous rubber hydrochloride obtainable by reacting sheet rubber with liquefied hydrogen chloride is a saturated product of approximately 29% to 30% chlorine content, of greater solubility and lower flow point than the crystalline saturated rubber hydrochlorides. It is more readily plasticized, and has less resistance to oils. The stabilized amorphous rubber hydrochloride, however, has as high resistance to ozone and ultra violet light, and as good dielectric properties as the crystalline types. The rubber hydrochloride obtainable by reacting solutions of rubber with hydrogen chloride may be partially saturated or saturated. These are crystalline rubber hydrochlorides which when stabilized compare favorably for electric uses to the amorphous stabilized product. For high flow point, and extremely high resistance to oils, however, the saturated crystalline rubber hydrochlorides obtainable by reacting sheet rubber with gaseous hydrogen chloride under superatmospheric pressure are preferred. These rubber hydrochlorides when stabilized are particularly suitable for use in tubing processes. In general, however, all types of rubber hydrochloride may be used. For some purposes, and especially when properly plasticized, stabilized chlorinated rubber hydrochlorides may be used. It is even possible to use partially saturated stabilized rubber hydrochlorides, but compounds below 85% saturation are tacky and generally unsuitable from the point of oil resistance, and resistance to ultra violet light. Also, compounds of over 40% chlorine content are generally too brittle. I prefer to use a substantially saturated rubber hydrochloride stabilized with basic alkali earth metal compounds and basic lead compounds.

It is to be understood that the rubber hydrochlorides include vulcanized rubber hydrochlorides. As an example of tubed insulation of vulcanized rubber hydrochloride, the following is given:

Example

A compound which consisted of:

|  | Parts by weight | |
| --- | --- | --- |
|  | Y-1 | 24-DP-263 |
| High temperature, insoluble type rubber hydrochloride | 100 | 100 |
| Magnesium oxide | 15 | 10 |
| Litharge | 20 | 10 |
| Stearic acid |  | 1 |
| Whiting (Cliffstone) | 140 |  |
| Thermax |  | 12 |
| Opal wax | 5 |  |
| Montan wax |  | 1 |
| Cumar | 5 |  |
| Ketonone B |  | 18 |
| Hexamethylene tetramine | 1 | 2 |
| Sulfur | 7 | 3 |
| Butyr-aldehyde-aniline | 5 | 2 | was prepared by the usual milling operation.

This compound was forced through a tubing machine to form the insulation for, for example #16 gauge copper wire. The insulated wire was coiled in circular pans and buried in soapstone in the manner usually employed with wire insulated with natural rubber. The pan containing the soapstone and insulated wire was then heated in open steam at 300° F. for one hour. The resulting product resembled insulated wire prepared with natural rubber. Where high elasticity and resilience is not required, the vulcanizing ingredients may be eliminated and the long cure replaced by a quick molding operation. When this is done, the amount of plasticizer, which preferably should be an oil resistant plasticizer such as Opal wax, should be increased.

This application is a continuation in part of applicant's copending application, Serial No. 55,413, filed December 20, 1935, now Patent 2,115,055, which in turn is a continuation in part of application Serial No. 11,665 filed March 15, 1935, now Patent 2,046,986.

I claim:

1. An electrical conductor of high dielectric strength, flexibility, water and oil resistance, ozone and ultra violet ray resistance comprising a conductor wire covered with a composition of an intimate mixture of rubber hydrochloride and a basic stabilizer.

2. An electrical conductor of high dielectric strength, flexibility, water and oil resistance, ozone and ultra violet ray resistance comprising a conductor wire covered with a composition of an intimate mixture of rubber hydrochloride and a stabilizer including a basic lead compound.

3. An electrical conductor of high dielectric strength, flexibility, water and oil resistance, ozone and ultra violet ray resistance comprising a conductor wire covered with a composition of an intimate mixture of rubber hydrochloride and a minor proportion of litharge.

4. An electrical conductor of high dielectric strength, flexibility, water and oil resistance, ozone and ultra violet ray resistance comprising a conductor wire covered with a composition of an intimate mixture of rubber hydrochloride and litharge, and a member of the class selected from the group consisting of chlorinated diphenyls, polycumarones, ester gum, rosin, alkyl resins and phenol-aldehyde resins.

5. An electrical conductor of high dielectric strength, flexibility, water and oil resistance, ozone and ultra violet ray resistance comprising a conductor wire covered with a composition comprising rubber hydrochloride, litharge and a wax.

6. An electrical conductor of high dielectric strength, flexibility, water and oil resistance, ozone and ultra violet ray resistance comprising a conductor wire covered with an inner layer of insulating material, a layer of fabric covering said inner layer, and a covering of a water resistant stabilized rubber hydrochloride composition including a lead compound as a stabilizer on said fabric.

7. An electrical conductor of high dielectric strength, flexibility, water and oil resistance, ozone and ultra violet ray resistance comprising a conductor wire covered with a composition of a vulcanized rubber hydrochloride including a basic substance as a stabilizer.

HERBERT A. WINKELMANN.